US 9,441,986 B2

(12) United States Patent
Cronin et al.

(10) Patent No.: US 9,441,986 B2
(45) Date of Patent: Sep. 13, 2016

(54) LOCALLY INVARIANT GLOBAL HYPOTHESIS TRACKING

(71) Applicant: Raytheon Company, Waltham, MA (US)

(72) Inventors: Brian A. Cronin, Hermosa Beach, CA (US); Nicholas J. Ploplys, Redondo Beach, CA (US); Ray B. Huffaker, Los Angeles, CA (US); Nicholas Sun, Cerritos, CA (US); Michael Boardman, San Rafael, CA (US)

(73) Assignee: Raytheon Company, Waltham, MA (US)

(*) Notice: Subject to any disclaimer, the term of this patent is extended or adjusted under 35 U.S.C. 154(b) by 150 days.

(21) Appl. No.: 13/862,075

(22) Filed: Apr. 12, 2013

(65) Prior Publication Data
US 2013/0275034 A1 Oct. 17, 2013

Related U.S. Application Data

(60) Provisional application No. 61/625,315, filed on Apr. 17, 2012.

(51) Int. Cl.
*G05D 1/02* (2006.01)
*G01C 23/00* (2006.01)
*G01S 13/72* (2006.01)

(52) U.S. Cl.
CPC ............ *G01C 23/00* (2013.01); *G01S 13/726* (2013.01)

(58) Field of Classification Search
CPC ...... G06F 17/00; G08G 1/166; G08G 1/167; G01C 21/00; G01C 21/20

USPC ......................................................... 701/300
See application file for complete search history.

(56) References Cited

U.S. PATENT DOCUMENTS

| 5,379,044 | A  | 1/1995  | Carlson et al.  |
| 6,295,367 | B1 | 9/2001  | Crabtree et al. |
| 7,193,557 | B1 | 3/2007  | Kovacich et al. |
| 7,623,676 | B2 | 11/2009 | Zhao et al.     |

(Continued)

OTHER PUBLICATIONS

Ingemar J. Cox et al.; "An Efficient Implementation of Reid's Multiple Hypothesis Tracking Algorithm and Its Evaluation for the Purpose of Visual Tracking"; IEEE Transactions on Pattern Analysis and Machine Intelligence; vol. 18; No. 2; pp. 138-150; Feb. 1996.

(Continued)

*Primary Examiner* — Behrang Badii
*Assistant Examiner* — Daniel L Greene
(74) *Attorney, Agent, or Firm* — Burns & Levinson LLP; Joseph M. Maraia

(57) ABSTRACT

The technology described herein includes a system and/or a method for global hypothesis tracking. In some examples, a method generates one or more paired segments based on track data representing kinematic data of target objects. Each paired segment includes a list of tracks incompatible with the paired segment, which are tracks sharing common track data, and a likelihood score. The method generates a transition probability between each pair of the paired segments based on the list of tracks incompatible with the paired segment and the likelihood score associated with each paired segment. The method further generates one or more multi-segment tracks based on the one or more paired segments also based on the transition probability between each pair of the paired segments.

21 Claims, 8 Drawing Sheets

(56) References Cited

U.S. PATENT DOCUMENTS

| | | | |
|---|---|---|---|
| 7,626,535 | B2 | 12/2009 | Ding et al. |
| 7,757,086 | B2 * | 7/2010 | Walmsley ................... 713/171 |
| 7,983,878 | B1 | 7/2011 | Denis |
| 8,098,891 | B2 | 1/2012 | Lv et al. |
| 2003/0036835 | A1 * | 2/2003 | Breed et al. ................... 701/45 |
| 2006/0028552 | A1 | 2/2006 | Aggarwal et al. |
| 2006/0268111 | A1 | 11/2006 | Zhang et al. |
| 2008/0002856 | A1 | 1/2008 | Ma et al. |
| 2008/0079629 | A1 | 4/2008 | Oka et al. |
| 2008/0101652 | A1 | 5/2008 | Zhao et al. |
| 2008/0144944 | A1 * | 6/2008 | Breed ........................... 382/224 |

OTHER PUBLICATIONS

Ola Friman et al.; "Multiple Hypothesis Template Tracking of Small 3D Vessel Structures; Medical Image Analysis"; vol. 14; No. 2; pp. 160-171; 2009.

Chee-Yee Chong et al., "Efficient Multiple Hypothesis Tracking by Track Segment Graph; International Conference on Information Fusion", Jul. 6-9, 2009, pp. 2177-2184.

Samuel S. Blackman, "Multiple Hypothesis Tracking for Multiple Target Tracking", IEEE A&E Systems Magazine vol. 19, No. 1, Jan. 2004, Part 2: Tutorials, pp. 5-18.

* cited by examiner

LOCALLY INVARIANT GLOBAL HYPOTHESIS TRACKING

RELATED APPLICATIONS

This application claims the benefit of U.S. Provisional Application No. 61/625,315, filed on Apr. 17, 2012. The entire teachings of the above applications are incorporated herein by reference.

BACKGROUND

Multiple hypothesis tracking (MHT) is utilized to track multiple targets at the same time. MHT is generally described by Samuel S. Blackman in Multiple Hypothesis Tracking for Multiple Target Tracking, IEEE A&E Systems Magazine, Vol. 19, No. 1, January 2004, pages 5-18. In some scenarios, a plurality of targets is tracked via a long-term track-oriented approach for hypothesis management which reconstitutes the long-term track hypotheses. The reconstitution of global hypotheses in the long-term track-oriented approach is time consuming and the performance of this step significantly impacts MHT tracking performance. Furthermore, the reconstitution of global hypotheses within the track-based MHT is an NP-hard problem, and previous approaches (e.g., breadth-first search, depth-first search, etc.) are ad-hoc and do not provide performance guarantees. Thus, a need exists in the art for improved locally invariant global hypothesis tracking for a plurality of target objects.

SUMMARY

One approach to global hypothesis tracking is a system that provides locally invariant global hypothesis tracking. The system includes a communication module configured to receive track data, the track data includes kinematic information associated with one or more target objects, feature likelihood information associated with the one or more target objects, or any combination thereof; a paired segment module configured to generate one or more paired segments based on the track data, each of the one or more paired segments includes a list of one or more tracks incompatible with the paired segment and a likelihood score; and a hypothesis module configured to generate one or more multi-segment tracks based on the one or more paired segments, and generate a transition probability between each pair of the one or more paired segments based on the list of one or more tracks incompatible with the paired segment and the likelihood score associated with each paired segment of the pair of the one or more paired segments.

Another approach to global hypothesis tracking is a method that provides locally invariant global hypothesis tracking. The method includes receiving track data, the track data includes kinematic information associated with one or more target objects, feature likelihood information associated with the one or more target objects, or any combination thereof; generating one or more paired segments based on the track data, each of the one or more paired segments includes a list of one or more tracks incompatible with the paired segment and a likelihood score; generating one or more multi-segment tracks based on the one or more paired segments; and generating a transition probability between each pair of the one or more paired segments based on the list of one or more incompatible tracks and the likelihood score associated with each paired segment of the pair of the one or more paired segments.

Another approach to global hypothesis tracking is a computer program product that is tangibly embodied in an information carrier. The computer program product includes instructions being operable to cause a data processing apparatus to receive track data, the track data includes kinematic information associated with one or more target objects, feature likelihood information associated with the one or more target objects, or any combination thereof; generate one or more paired segments based on the track data, each of the one or more paired segments includes a list of one or more tracks incompatible with the paired segment and a likelihood score; generate a transition probability between each pair of the one or more paired segments based on the list of one or more tracks incompatible with the paired segment and the likelihood score associated with each paired segment of the pair of the one or more paired segments; and generate one or more multi-segment tracks based on the one or more paired segments and the transition probability between each of the one or more paired segments.

In other examples, any of the approaches above can include one or more of the following features.

In some examples, the system further includes the communication module further configured to receive second track data, the second track data includes kinematic information associated with one or more target objects, feature likelihood information associated with the one or more target objects, or any combination thereof; the paired segment module further configured to generate one or more second paired segments based on the second track data, each of the one or more second paired segments includes a list of one or more tracks incompatible with the paired segment and a likelihood score; and the hypothesis module configured to generate one or more second multi-segment tracks based on the one or more paired segments and the one or more second paired segments, and generate a second transition probability between each pair of the one or more second paired segments based on the list of one or more incompatible tracks and the likelihood score associated with each paired segment of the pair of the one or more second paired segments.

In other examples, the track data is associated with a time period, the second track data is associated with a second time period, and the second time period occurs in time before the time period.

In some examples, the track data is associated with a time period and the system further includes the communication module further configured to receive second track data, the second track data associated with a second time period and the second time period occurs in time after the time period and the second track data includes kinematic information associated with one or more target objects, feature likelihood information associated with the one or more target objects, or any combination thereof; the paired segment module further configured to generate one or more second paired segments based on the second track data, each of the one or more second paired segments includes a list of one or more tracks incompatible with the paired segment and a likelihood score; the hypothesis module configured to generate one or more second multi-segment tracks based on the one or more paired segments and the one or more second paired segments, generate a second transition probability between each pair of the one or more second paired segments based on the list of one or more incompatible tracks and the likelihood score associated with each paired segment of the pair of the one or more second paired segments, associate the one or more second multi-segment tracks with the one or more multi-segment tracks based on a transition probability between intersecting paired segments, and generate one or more third multi-segment tracks based on the one or more multi-segment tracks, the one or more second multi-segment tracks, and the associations between the one or more second multi-segment tracks with the one or more multi-segment tracks.

In other examples, the system further includes a likelihood score module configured to determine the feature likelihood information based on a target object in the track data, and generate the likelihood score for each of the one or more paired segments based on the kinematic information and the feature likelihood information.

In some examples, the system further includes a likelihood score module configured to determine the feature likelihood information based on a target object shape in the track data, an image feature in the track data, a radar related feature in the track data, a spectral feature in the track data, measurement and signature intelligence data in the track data, intelligence information associated with the track data, or any combination thereof, and generate the likelihood score for each of the one or more paired segments based on the kinematic information and the feature likelihood information.

In other examples, the system further includes an incompatible track module configured to generate the list of the one or more tracks incompatible with the paired segment for each of the one or more paired segments based on the kinematic information.

In some examples, the method further includes receiving second track data, the second track data includes kinematic information associated with one or more target objects, feature likelihood information associated with the one or more target objects, or any combination thereof; generating one or more second paired segments based on the second track data, each of the one or more second paired segments includes a list of one or more tracks incompatible with the paired segment and a likelihood score; generating a transition probability between each pair of the one or more second paired segments based on the list of one or more incompatible tracks and the likelihood score associated with each paired segment of the pair of the one or more second paired segments; and generating one or more second multi-segment tracks based on the one or more paired segments, the one or more second paired segments, and the transition probability between each of the one or more second paired segments.

In other examples, the track data is associated with a time period and the method further includes receiving second track data, the second track data associated with a second time period and the second time period occurs in time after the time period and the second track data includes kinematic information associated with one or more target objects, feature likelihood information associated with the one or more target objects, or any combination thereof; generating one or more second paired segments based on the second track data, each of the one or more second paired segments includes a list of one or more tracks incompatible with the paired segment and a likelihood score; generating a second transition probability between each pair of the one or more second paired segments based on the list of one or more tracks incompatible with the paired segment and the likelihood score associated with each paired segment of the pair of the one or more second paired segments; generating one or more second multi-segment tracks based on the one or more paired segments, the one or more second paired segments, and the transition probability between each of the one or more second paired segments; associating the one or more second multi-segment tracks with the one or more multi-segment tracks based on a transition probability between intersecting paired segments; and generating one or more third multi-segment tracks based on the one or more multi-segment tracks, the one or more second multi-segment tracks, and the associations between the one or more second multi-segment tracks with the one or more multi-segment tracks.

In some examples, the method further includes determining the feature likelihood information based on a target object shape in the track data, an image intensity frequency in the track data, or any combination thereof, and generating the likelihood score for each of the one or more paired segments based on the kinematic information and the feature likelihood information.

In other examples, the method further includes receiving second track data, the second track data includes feature likelihood information associated with at least one of the one or more target objects; associating the second track data with the at least one of the one or more target objects; generating a second transition probability between each pair of the one or more second paired segments based on the list of one or more incompatible tracks, the likelihood score associated with each paired segment of the pair of the one or more second paired segments, and the second track data associated the at least one of the one or more target objects; and generating one or more second multi-segment tracks based on the one or more paired segments, the one or more second paired segments, and the transition probability between each of the one or more second paired segments.

In some examples, the second track data further includes kinematic information that is not assigned to the one or more target objects.

In other examples, the method further includes generating a plurality of target tracks based on the one or more multi-segment tracks; and selecting a long-term track for each of the one or more target objects based on the plurality of target tracks and the transition probability between each part of the one or more paired segments.

In some examples, the method further includes generating the list of the one or more tracks for each of the one or more paired segments based on the kinematic information.

In other examples, the likelihood score for each paired segment of the one or more paired segments is indicative of a probability of a transition in a track between the paired segment.

In some examples, the feature likelihood information is indicative of a probability of a feature type in the track data.

In other examples, each of the one or more paired segments are indicative of a local cluster hypothesis of a movement of a target object along a track.

In some examples, the one or more multi-segment tracks are indicative of a global hypothesis of a movement of a target object along a track.

In other examples, the track data includes measurement and signature intelligence data, movement intelligence data, signal intelligence data, imagery intelligence data, human intelligence data, or any combination thereof.

The locally invariant global hypothesis tracking techniques described herein can provide one or more of the following advantages. An advantage to the technology is that the local pairing enables a fast and efficient grouping of long-term tracks for identification of target objects in hypotheses, thereby reducing mis-identifications of target objects. Another advantage of the technology is that the organization of the tracks in a pair form enables the data to be grouped together utilizing less processing time and less memory, thereby decreasing the overall track identification time. Another advantage of the technology is that a large number of pairs (e.g., hundreds, thousands, etc.) can be quickly processed locally and then over a long-term track to reduce the risk that a target object is not properly tracked, thereby increasing the efficiency of the technology.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
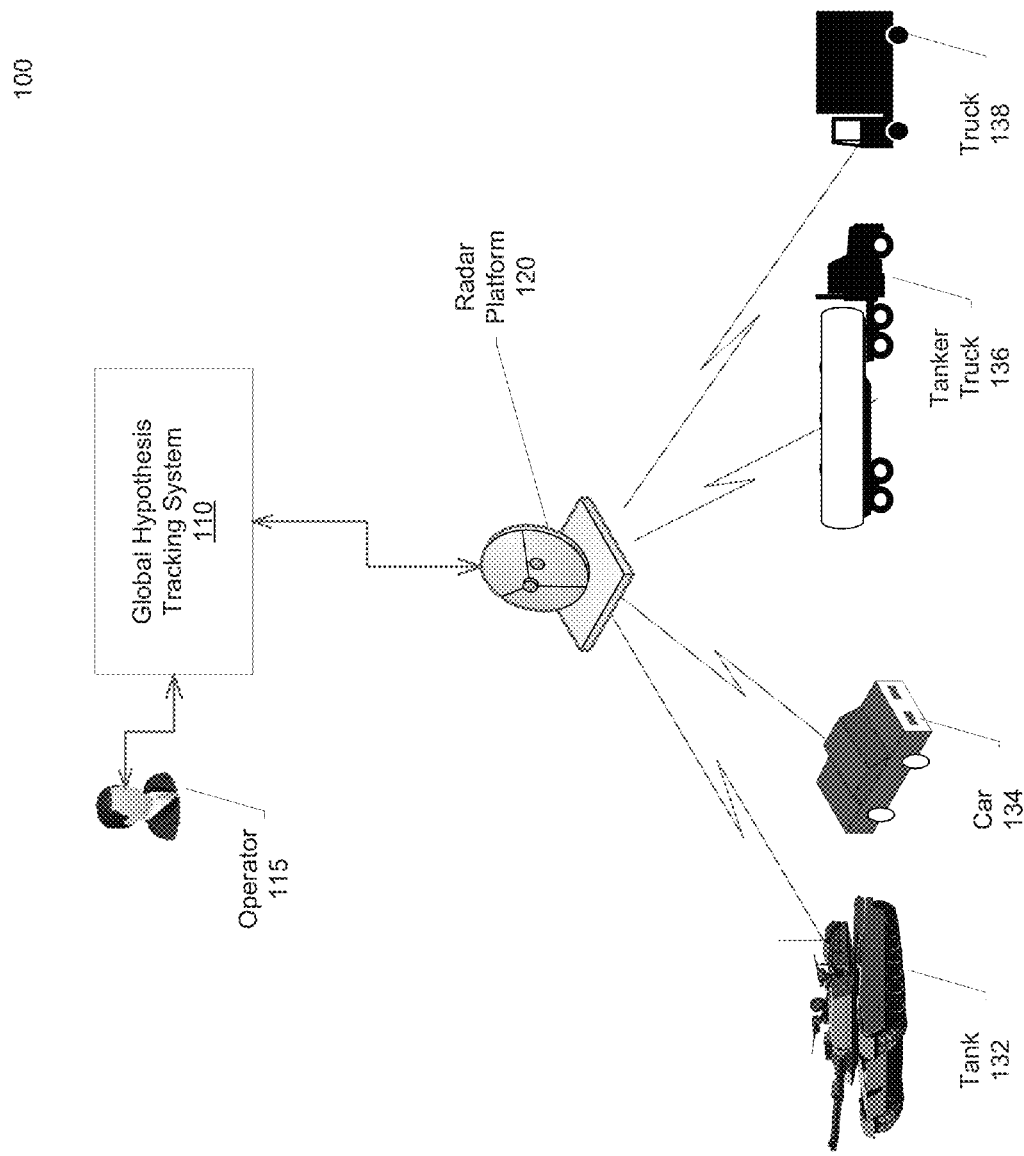
FIG. 1 is a diagram of an exemplary global hypothesis tracking environment.

The reconstitution of global hypotheses in the track-based multiple hypothesis tracking (MHT) method and apparatus includes technology that, generally, tracks sensor hits (also referred to as track data) (e.g., radar tracking, sonar tracking, video tracking, etc.) to generate paired segments of possible target object tracks and transition probabilities between each paired segment (e.g., the probability that a long-term track includes the two paired segments, the probability that the two paired segments would transition between each other, etc.). The technology can utilize the paired segments and transition probabilities to generate long-term tracks of the target objects (e.g., a car goes from point A to B to C to D, an airplane goes from a first set of coordinates and travels through ten additional sets of coordinates, etc.). The technology is utilized to efficiently and accurately track multiple moving targets and the results of the technology (e.g., target object tracks, track identification, etc.) can be utilized for a plurality of applications (e.g., navigation, communication, defensive application, offensive application, etc.).

The technology advantageously utilizes paired segments of the possible object tracks to minimize processing and memory requirements while decreasing the global hypothesis processing time. The global hypothesis processing time is the time that the technology takes to determine if a target object is on a particular track. The smaller clustering (short-term paring versus long-term tracks) of the technology enables faster processing due to less data processing for each instance of data, thereby decreasing the processing cost of the technology.

In operation, for example, the technology generates a plurality of paired segments of target object locations (e.g., Track 1 to Track 2, Track 3 to Track 4, Track 1 to Track 4, etc.) based on track data (e.g., video data, radar data, etc.). Each of the paired segments is a short-term association of tracks (e.g., track objects from ten seconds apart, track objects from twenty minutes apart, etc.). The technology can generate long-term tracks (e.g., target object track over ten days with twelve hour data increments, target object track over ten minutes with ten second data increments, etc.) based on the paired segments in response to a request from a user and/or another system (e.g., target tracking system, video tracking system, etc.). The use of the short-term paired segments advantageously enables the technology to add new paired segments without re-processing the long-term tracks, thereby reducing the processing time and cost associated with adding new data.

Table 1 illustrates exemplary tracks (also referred to as tracklets). The technology determines the kinematic information (e.g., speed, vector, etc.) and the feature likelihood information (e.g., target object shape, target object emitting information, etc.). Table 2 illustrates exemplary paired segments of the tracks illustrated in Table 1. The technology generates the incompatible tracks (e.g., time incompatible, location incompatible based on kinematic information, shares source segment, shares destination segment, etc.) and the likelihood score (e.g., percentage likelihood of the paired segment, factor indicating whether the paired segment are not likely, etc.) based on the data about each track (e.g., kinematic information, feature likelihood information, etc.). Table 3 illustrates the exemplary transition probabilities between each of the paired segments. The technology generates (e.g., formulaic average of the factors, weighted average of the factors, etc.) the transition probabilities based on the incompatible tracks and the likelihood score. For example, if the next track is an incompatible track, the transition probability is zero. As another example, if the next track is compatible, the likelihood score is utilized as the transition probability. As another example, the likelihood scores for both of the paired segments are averaged to generate the transition probability.

TABLE 1

Exemplary Tracks

| Track ID | Time | Kinematic Information | Feature Likelihood Information |
|---|---|---|---|
| A | 04:02 | 80 kilometers per hour | Large Shape |
| B | 04:04 | 45 kilometers per hour | Narrow Shape |
| C | 04:06 | 82 kilometers per hour | Large Shape |
| D | 04:07 | 38 kilometers per hour | Narrow Shape |
| E | 04:07 | 83 kilometers per hour | Large Shape |
| F | 04:02 | 43 kilometers per hour | Small Shape |

TABLE 2

Exemplary Paired Segments

| Paired Segments | Incompatible Tracks | Likelihood Score |
|---|---|---|
| A-B | NA | 20% |
| A-C | B | 99% |
| A-D | B, C, F | 20% |
| A-E | B, C, D, F | 55% |
| A-F | NA | 20% |
| B-C | A, F | 18% |
| B-D | A, C, E, F | 88% |
| C-D | A, B, F | 17% |
| C-E | A, B, D, F | 95% |
| F-B | A | 65% |
| F-C | A, B | 5% |

TABLE 2-continued

Exemplary Paired Segments

| Paired Segments | Incompatible Tracks | Likelihood Score |
|---|---|---|
| F-D | A, B, C | 92% |
| ... | ... | ... |

TABLE 3

Exemplary Transition Probabilities

| Paired Segment Start | Paired Segment End | Transition Probability |
|---|---|---|
| A-B | A-C | 0% |
| A-F | F-B | 5% |
| A-C | C-E | 95% |
| ... | ... | ... |

In other examples, the technology can utilize the plurality of paired segments to add out of time order track data (e.g., track data from a second sensor platform two hours after processing of track data from a first sensor platform, track data from a fifth sensor platform five minutes after processing of trade data from four other sensor platforms, etc.), thereby increasing the effective uses of the technology by adding additional tracking information after the initial processing. The use of paired segments enables the quick and efficient addition of out of time order track data, thereby increasing the effective uses of the technology while reducing memory usage (i.e., the paired segments require less storage space than long-term target tracks) since new track data requires the addition of new pairings and not the re-generation of long-term tracks.

FIG. 1 is a diagram of an exemplary global hypothesis tracking environment 100. The environment 100 includes a global hypothesis tracking system 110 and a radar platform 120. An operator 115 views and/or tracks an object (in this example, a tank 132, a car 134, a tanker truck 136, and a truck 138) utilizing the global hypothesis tracking system 110. The radar platform 120 transmits and/or receives electromagnetic waves to track the objects and/or a plurality of other objects (not shown). For example, the radar platform 120 transmits electromagnetic waves over a period of time and receives the reflection of the electromagnetic waves from the tank 122 over the plurality of times. The radar platform 120 communicates data (e.g., digital representation of a radar reflection of the tank 132, processed data representation of the tank 132, etc.) to the global hypothesis tracking system 110.

In operation, for example, the global hypothesis tracking system 110 receives track data (e.g., raw radar data, pre-processed radar data, etc.) from the radar platform 120. The track data can include kinematic information (e.g., speed, vector, location, etc.) associated with one or more target objects (e.g., the tank 132, the car 134, etc.). The track data can include feature likelihood information (e.g., shape, image intensity, operating conditions, etc.) associated with one or more target objects (e.g., the tank 132, the car 134, etc.).

The global hypothesis tracking system 110 generates one or more paired segments (e.g., target object A at time A and target object A at time B; target object B at time A and target object A at time B; etc.) based on the track data. Each of the one or more paired segments includes a list of one or more tracks incompatible with the paired segment (e.g., not possible based on location and speed, not possible based on time, not possible based on other factors, etc.) and a likelihood score (e.g., weighting of comparison of kinematic information and feature likelihood information, difference between the speeds, etc.). The generation of the paired segments can be independent of past and future segment associations and can be based solely on the kinematic information and the feature likelihood information. In other words, the generation of the paired segments is based on the information for the particular pairing and not other past/future information.

The global hypothesis tracking system 110 generates one or more multi-segment tracks based on the one or more paired segments (e.g., every combination of paired segments, every combination of paired segments with similar kinematic information, etc.). The global hypothesis tracking system 110 generates a transition probability between each pair of the one or more paired segments based on the list of one or more tracks incompatible with the paired segment and the likelihood score associated with each paired segment of the pair of the one or more paired segments. For example, the global hypothesis tracking system 110 determines if there is an incompatible between the pair of the paired segments and if there is an incompatible, the transition probability is 0%. As another example, the global hypothesis tracking system 110 determines if there is an incompatible between the pair of the paired segments and if there is an incompatible, the transition probability is 10% (or any other pre-set amount) and then the likelihood score for each of the paired segments is averaged into the pre-set amount.

The global hypothesis tracking system 110 can store the short-term tracks (also referred to as the one or more paired segments and the transition probabilities for each pair). The storage of the short-term tracks by the global hypothesis tracking system 110 enables the addition of other segments in the same time period as the existing segments without re-generation of the long-term tracks (e.g., association of a plurality of short-term tracks, generation of the associations between short-term tracks based on transition probabilities, etc.). The global hypothesis tracking system 110 can generate the long-term tracks based on the transition probabilities between each pair of the paired segments (e.g., selection of the highest probability between each paired segment, selection of the highest probability at each time entry, etc.).

In some examples, the each target object is a ground vehicle (e.g., tank, car, etc.), an air vehicle (e.g., blimp, plane, etc.), a space vehicle (e.g., space shuttle, satellite, etc.), and/or a water vehicle (e.g., boat, ship, submarine, etc.).

Although FIG. 1 illustrates the radar platform 120, the global hypothesis tracking system 110 can receive data from any type of sensor device (e.g., video, sonar, infrared, etc.). Although FIG. 1 illustrates the radar platform 120, the environment 100 can utilize any number of radar platforms (e.g., ten radar platforms, one hundred radar platforms, etc.). For example, the global hypothesis tracking system 110 can receive radar data from any number of radar platforms for the same object or different objects. In other examples, the radar platform 120 can include a plurality of radars and/or other types of sensor devices (e.g., video camera, motion sensor, environmental sensor, heat sensor, etc.).

Figure 2:
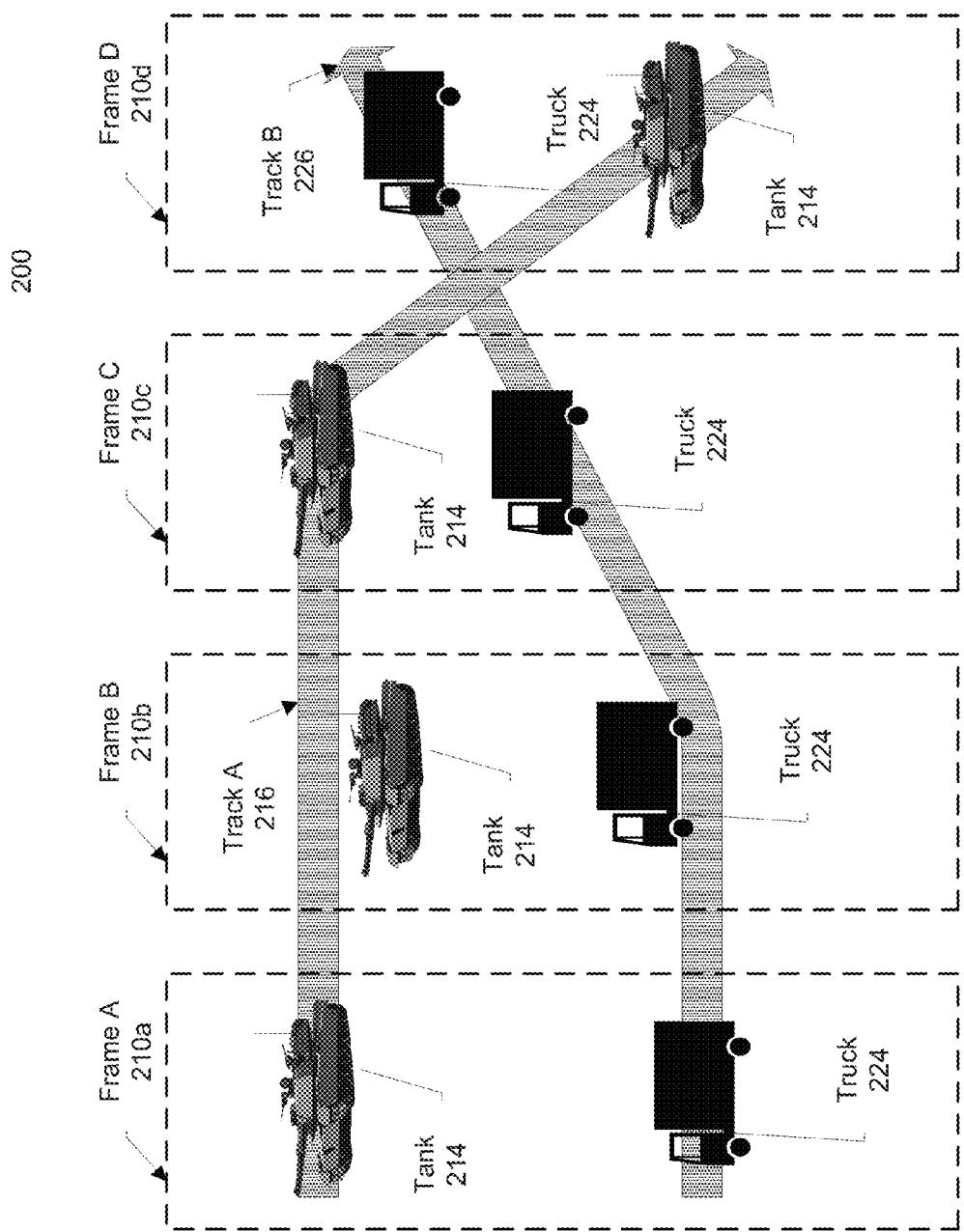
FIG. 2 is a diagram of another exemplary global hypothesis tracking environment.

FIG. 2 is a diagram of another exemplary global hypothesis tracking environment 200. The environment 200 illustrates tracking data at four times Frame A 210a, Frame B 210b, Frame C 210c, and Frame D 210d. A radar platform (not shown) tracks a tank 214 and a truck 224 through the four times (e.g., 4:03.23, 4:04.24, 4:05.43, 4:06.43). As illustrated in FIG. 2, the tank 214 proceeded along track A 216 and the truck 224 proceeded along track B 226. The tracks A 216 and B 226 intersect each other. The radar platform transmits and/or receives electromagnetic waves to track the tank 214 and the truck 224. The radar platform communicates data (e.g., digital representation of a radar reflection of the tank 214, processed data representation of the tank 214, etc.) to a global hypothesis tracking system (not shown).

The global hypothesis tracking system receives the tracking data from the radar platform. Using any of the processes as described herein, the global hypothesis tracking system can assign the truck 224 to the track B 226 and the tank 214 to the track A 216. The assignment of the target objects (in this example, the truck 224 and the tank 214) to the tracks enables the global hypothesis tracking system to properly track the target object. For example, in a navigation application, another truck is following the truck 224. In this example, the global hypothesis tracking system can properly distinguish the tracks so that the other truck properly follows the truck 224 instead of the tank 214 after the tracks A 216 and B 226 intersect.

Figure 3A:
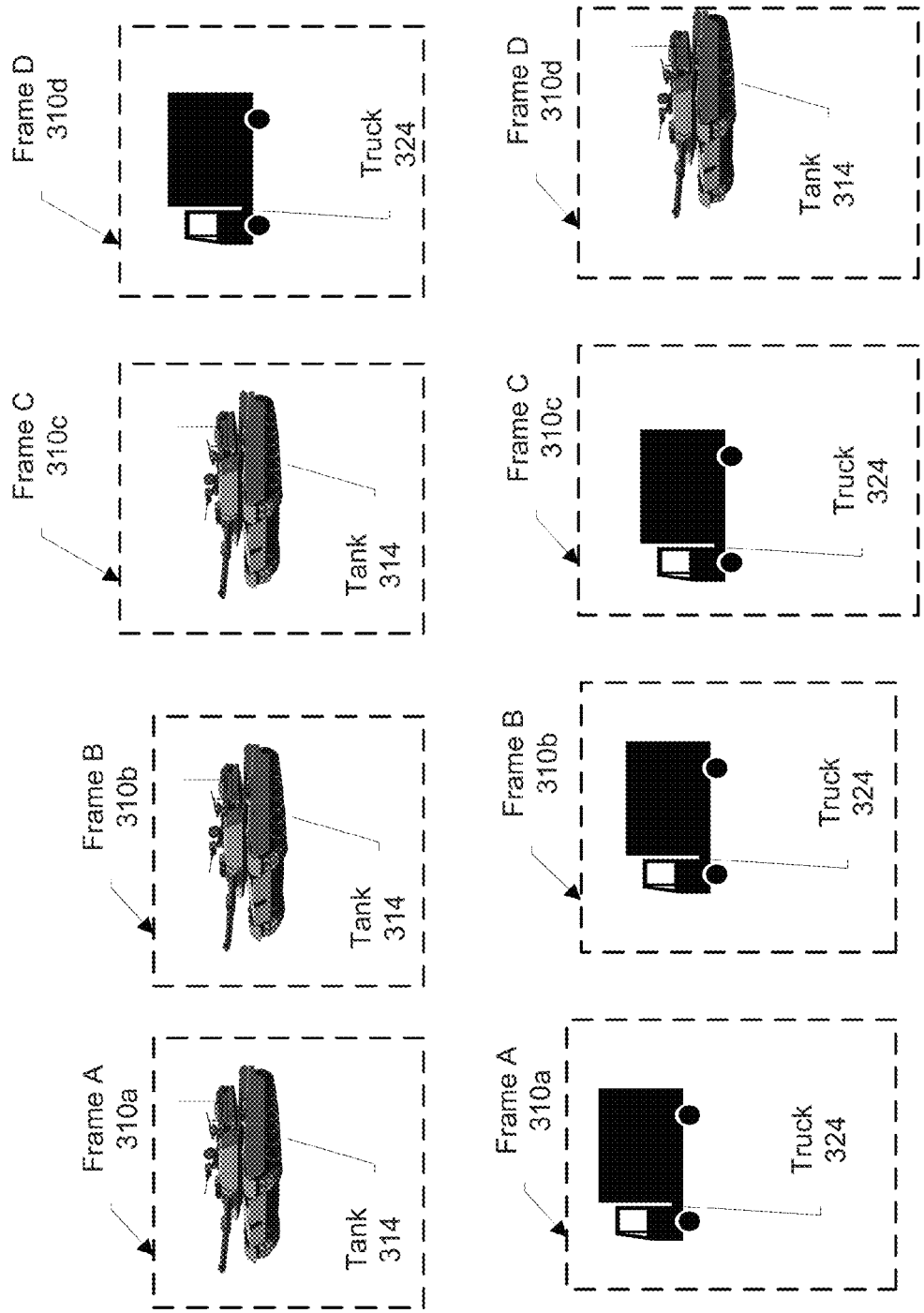
FIGS. 3A-3C illustrate exemplary global hypothesis tracking of target objects.

FIG. 3A illustrates paired segments of track data received by a global hypothesis tracking system from the environment 200 illustrated in FIG. 2. The paired segments of track data include tank 314 in frame A 310a, tank 314 in frame B 310b, tank 314 in frame C 310c, tank 314 in frame C 310c, truck 324 in frame A 310a, truck 324 in frame B 310b, truck 324 in frame C 310c, and truck 324 in frame C 310c.

Figure 3B:
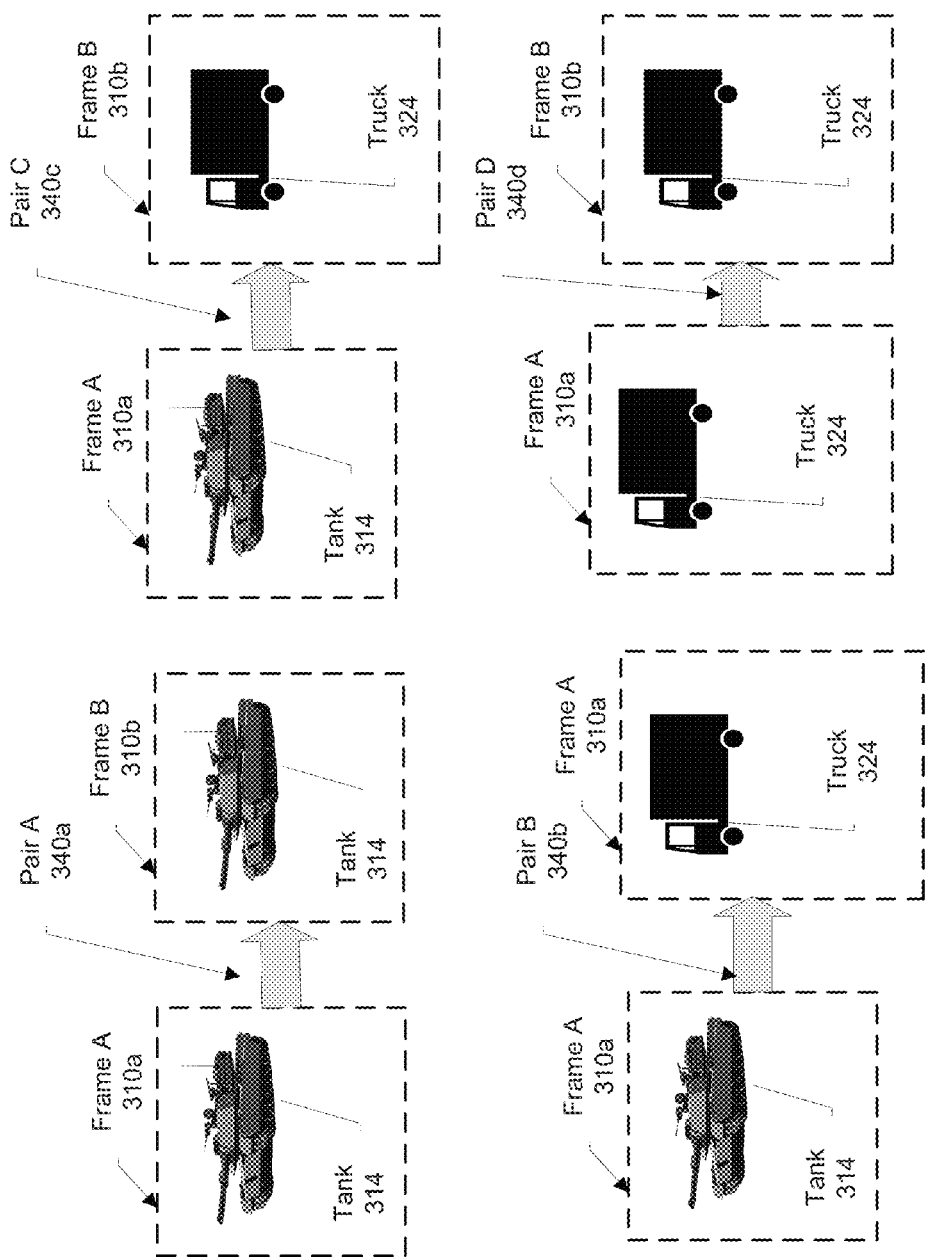

FIG. 3B illustrates the pairing of the paired segments of track data illustrated in FIG. 3A. The technology generates the pairings of the paired segments (e.g., every possible combination of paired segments, every combination of paired segments, etc.). The pairing of the paired segments include pairs A 340a (tank 314 in frame A 310a to tank 314 in frame B 310b), B 340b (tank 314 in frame A 310a to truck 324 in frame A 310a), C 340c (tank 314 in frame A 310a to truck 324 in frame B 310b), and D 340d (truck 324 in frame A 310a to truck 324 in frame B 310b). Although FIG. 3B only illustrates four pairings, the technology can generate pairings for every iteration of paired segments. The technology adds new track data to the pairing of the paired segments by adding additional pairing components. In other words, new track data does not require a complete re-generation of tracks and thus, reduces the processing required to track target objects.

Figure 3C:
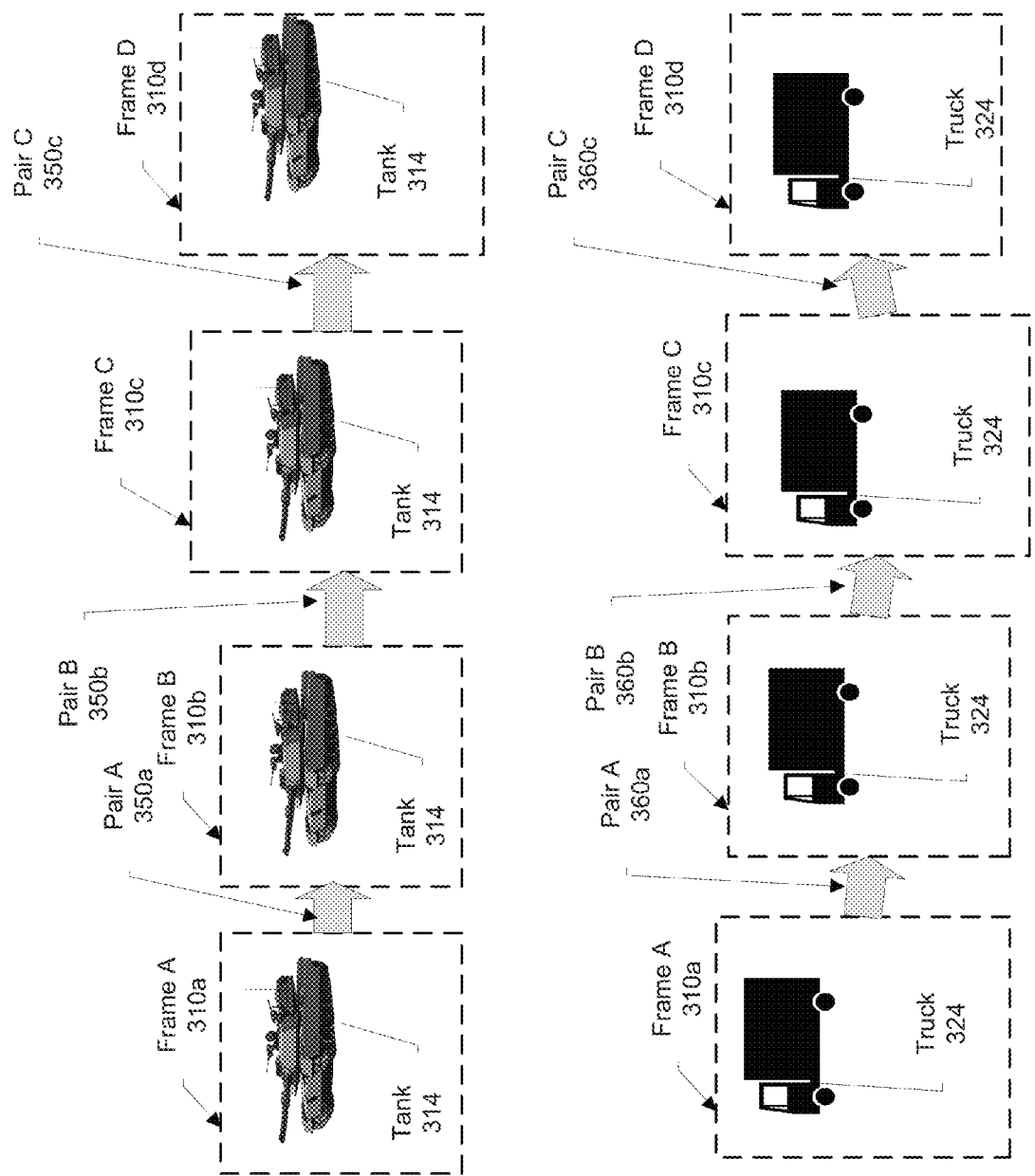

FIG. 3C illustrates long-term tracks generated from the pairing of the paired segments illustrated in FIG. 3B. The technology generates the long-term tracks based on the pairings of the paired segments and transition probabilities associated with each pairing (e.g., 80% probability that the pairing is correct, weight of 5/10 that the pairing is incorrect, etc.). The long-term track illustrates the pairing between each of the paired segments: tank 314 from frames A 310a, B 310b, C 310c, and D 310d via pairs A 350a, B 350b, and C 350c, respectively, and truck 324 from frames A 310a, B 310b, C 310c, and D 310d via pairs A 360a, B 360b, and C 360c, respectively. The technology can generate the long-term tracks based on a request from a user (e.g., tracking system operator, targeting system operator, etc.), a third party system (e.g., targeting system, tracking system, etc.), and/or an automated process (e.g., long-term track generation over hour, long-term track generation based on new track data, etc.).

Figure 4:
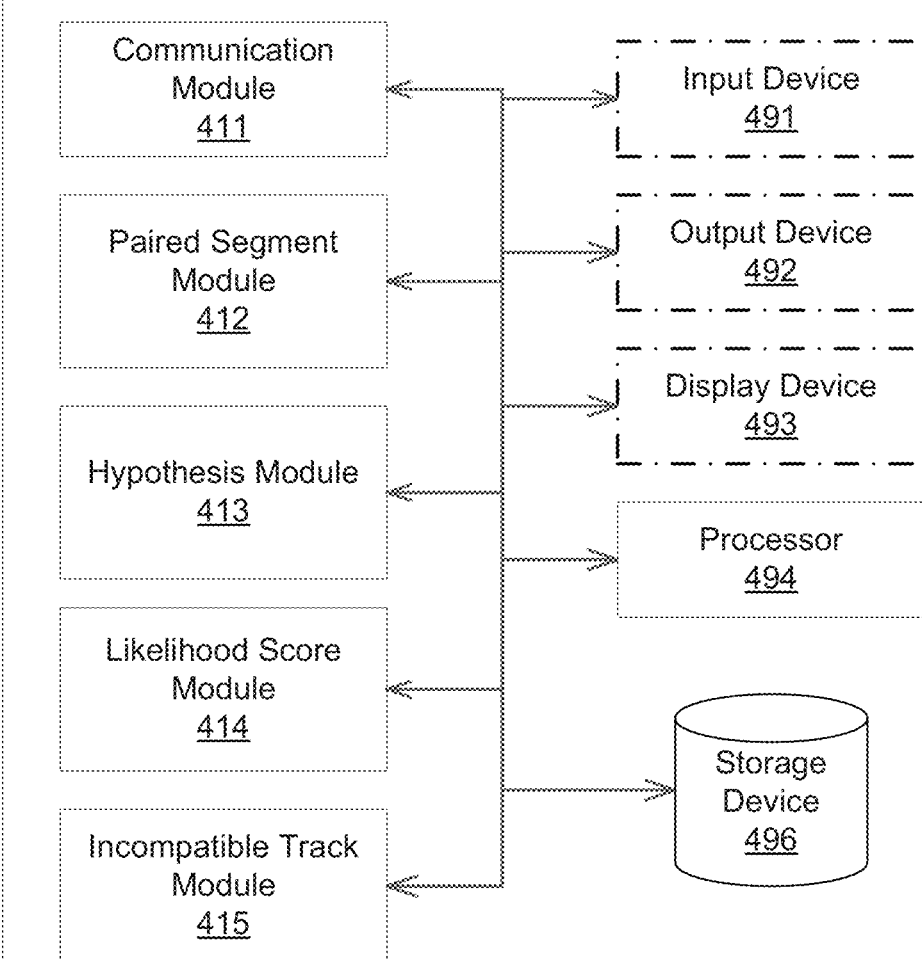
FIG. 4 is a block diagram of an exemplary global hypothesis tracking system.

FIG. 4 is a block diagram of an exemplary global hypothesis tracking system 410. The global hypothesis tracking system 410 includes a communication module 411, a paired segment module 412, a hypothesis module 413, a likelihood score module 414, an incompatible track module 415, an input device 491, an output device 492, a display device 493, a processor 494, and a storage device 496. The modules and devices described herein can, for example, utilize the processor 494 to execute computer executable instructions and/or include a processor to execute computer executable instructions (e.g., an encryption processing unit, a field programmable gate array processing unit, etc.). It should be understood that the global hypothesis tracking system 410 can include, for example, other modules, devices, and/or processors known in the art and/or varieties of the illustrated modules, devices, and/or processors. The input device 491, the output device 492, and/or the display 493 are optional components of the global hypothesis tracking system 410.

The communication module 411 receives track data (e.g., raw sensor data from a video camera, pre-processed sensor data from a data storage system, etc.). The track data includes kinematic information associated with one or more target objects and/or feature likelihood information associated with the one or more target objects.

In some examples, the communication module 411 receives second track data. The second track data includes kinematic information associated with one or more target objects and/or feature likelihood information associated with the one or more target objects. In other examples, the second track data is associated with a second time period and the second time period occurs in time after the time period.

The paired segment module 412 generates one or more paired segments based on the track data. Each of the one or more paired segments includes a list of one or more tracks incompatible with the paired segment and a likelihood score.

In some examples, the paired segment module 412 generates one or more second paired segments based on the second track data. Each of the one or more second paired segments includes a list of one or more tracks incompatible with the paired segment and a likelihood score.

In other examples, the paired segment module 412 generates one or more second paired segments based on the second track data. Each of the one or more second paired segments includes a list of one or more tracks incompatible with the paired segment and a likelihood score.

The hypothesis module 413 generates one or more multi-segment tracks based on the one or more paired segments. The hypothesis module 413 generates a transition probability between each pair of the one or more paired segments based on the list of one or more tracks incompatible with the paired segment and the likelihood score associated with each paired segment of the pair of the one or more paired segments.

In some examples, the hypothesis module 413 generates one or more second multi-segment tracks based on the one or more paired segments and the one or more second paired segments. In other examples, the hypothesis module 413 generates a second transition probability between each pair of the one or more second paired segments based on the list of one or more incompatible tracks and the likelihood score associated with each paired segment of the pair of the one or more second paired segments.

In some examples, the hypothesis module 413 generates one or more second multi-segment tracks based on the one or more paired segments and the one or more second paired segments. In other examples, the hypothesis module 413 generates a second transition probability between each pair of the one or more second paired segments based on the list of one or more incompatible tracks and the likelihood score associated with each paired segment of the pair of the one or more second paired segments. In some examples, the hypothesis module 413 associates the one or more second multi-segment tracks with the one or more multi-segment tracks based on a transition probability between intersecting paired segments. In other examples, the hypothesis module 413 generates one or more third multi-segment tracks based on the one or more multi-segment tracks, the one or more second multi-segment tracks, and the associations between the one or more second multi-segment tracks with the one or more multi-segment tracks.

The likelihood score module 414 determines the feature likelihood information based on a target object in the track data. The likelihood score module 414 generates the likelihood score for each of the one or more paired segments based on the kinematic information and the feature likelihood information.

In some examples, the likelihood score module 414 determines the feature likelihood information based on a target object shape in the track data, an image feature in the track data, a radar related feature in the track data, a spectral feature in the track data, measurement and signature intelligence (MASINT) data in the track data, and/or intelligence information associated with the track data. The likelihood score module 414 generates the likelihood score for each of the one or more paired segments based on the kinematic information and the feature likelihood information.

The incompatible track module 415 generates the list of the one or more tracks incompatible with the paired segment for each of the one or more paired segments based on the kinematic information.

In some examples, the track data is associated with a time period, the second track data is associated with a second time period, and the second time period occurs in time before the time period. In other examples, the track data is associated with a time period.

The input device 4391 receives information associated with the global hypothesis tracking system 410 (e.g., instructions from a user, instructions from another computing device, etc.) from a user (not shown) and/or another computing system (not shown). The input device 491 can include, for example, a keyboard, a scanner, etc. The output device 492 outputs information associated with the global hypothesis tracking system 410 (e.g., information to a printer (not shown), information to a speaker, etc.).

The display device 493 displays information associated with the global hypothesis tracking system 410 (e.g., status information, configuration information, etc.). In some examples, the display device 493 displays the target object track and/or any other information associated with the global hypothesis tracking system 410 to an operator. The processor 494 executes the operating system and/or any other computer executable instructions for the global hypothesis tracking system 410 (e.g., executes applications, etc.).

The storage device 496 stores the received data (e.g., actual radar data, processed radar data, etc.), the identifications, and/or any other data associated with the global hypothesis tracking system 410. The storage device 396 can store image information and/or any other data associated with the global hypothesis tracking system 410. The storage device 496 can include a plurality of storage devices and/or the global hypothesis tracking system 410 can include a plurality of storage devices (e.g., a radar storage device, an identification storage device, etc.). The storage device 496 can include, for example, long-term storage (e.g., a hard drive, a tape storage device, flash memory, etc.), short-term storage (e.g., a random access memory, a graphics memory, etc.), and/or any other type of computer readable storage.

Figure 5:
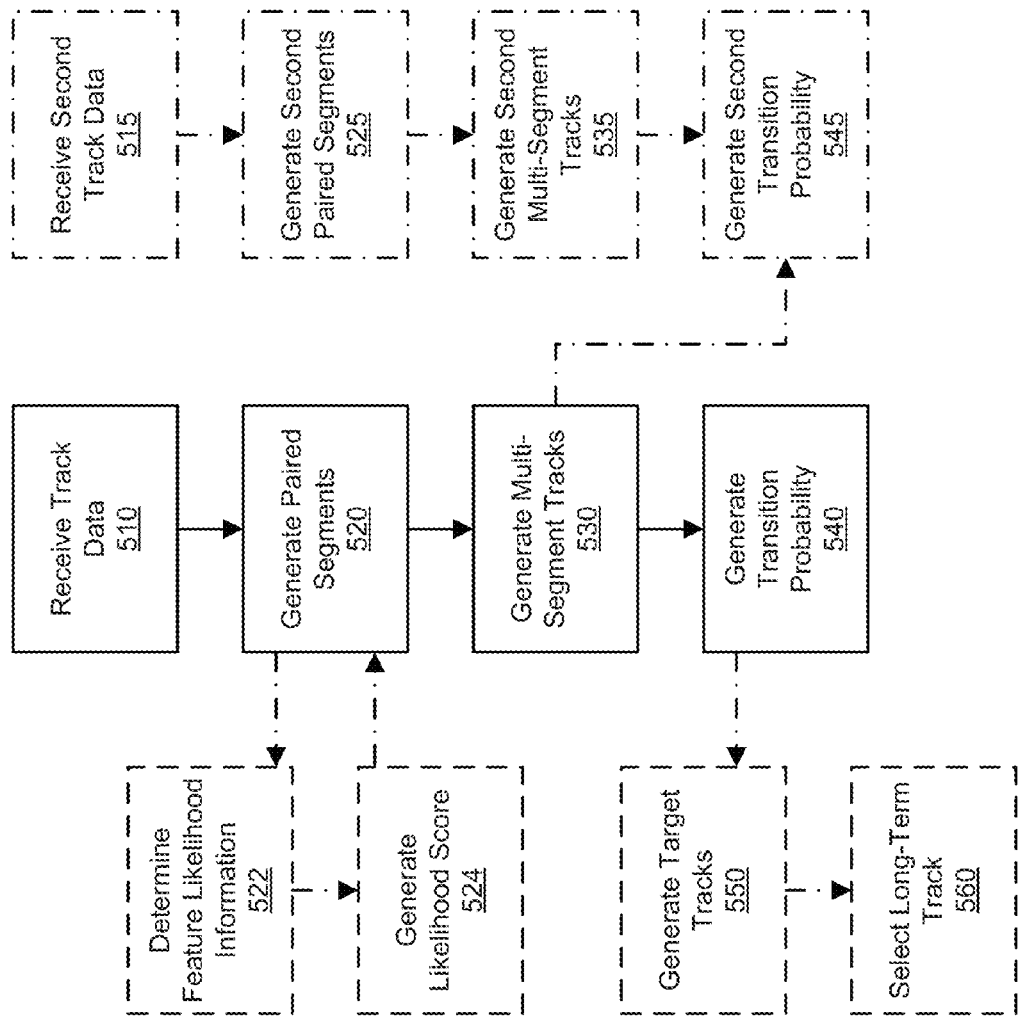
FIG. 5 is a flowchart of an exemplary global hypothesis tracking process.

FIG. 5 is flowchart of an exemplary global hypothesis tracking method, utilizing, for example, the global hypothesis tracking system 110 of FIG. 1. The global hypothesis tracking system 110 receives (510) track data. The track data can include kinematic information (e.g., speed, vector, etc.) associated with one or more target objects and/or feature likelihood information (e.g., size, shape, etc.) associated with the one or more target objects. The global hypothesis tracking system 110 generates (520) one or more paired segments based on the track data. Each of the one or more paired segments includes a list of one or more tracks incompatible with the paired segment and a likelihood score. The global hypothesis tracking system 110 generates (530) one or more multi-segment tracks based on the one or more paired segments. The global hypothesis tracking system 110 generates (540) a transition probability between each pair of the one or more paired segments based on the list of one or more incompatible tracks and the likelihood score associated with each paired segment of the pair of the one or more paired segments.

In some examples, the global hypothesis tracking system 110 receives (515) second track data. The second track data includes kinematic information associated with one or more target objects and/or feature likelihood information associated with the one or more target objects. The global hypothesis tracking system 110 generates (525) one or more second paired segments based on the second track data. Each of the one or more second paired segments includes a list of one or more tracks incompatible with the paired segment and a likelihood score. The global hypothesis tracking system 110 generates (535) one or more second multi-segment tracks based on the one or more paired segments, the one or more second paired segments, and the transition probability between each of the one or more second paired segments. The global hypothesis tracking system 110 generates (545) a transition probability between each pair of the one or more second paired segments based on the list of one or more incompatible tracks and the likelihood score associated with each paired segment of the pair of the one or more second paired segments.

In other examples, the track data is associated with a time period. The global hypothesis tracking system 110 receives second track data and the second track data is associated with a second time period and the second time period occurs in time after the time period.

In some examples, the global hypothesis tracking system 110 associates the one or more second multi-segment tracks with the one or more multi-segment tracks based on a transition probability between intersecting paired segments. The global hypothesis tracking system 110 generates one or more third multi-segment tracks based on the one or more multi-segment tracks, the one or more second multi-segment tracks, and the associations between the one or more second multi-segment tracks with the one or more multi-segment tracks.

In other examples, the global hypothesis tracking system 110 determines (522) the feature likelihood information based on a target object shape in the track data (e.g., narrow shape, large shape, airplane shape, tank shape, etc.) and/or an image intensity frequency in the track data (e.g., 95% intensity on the first third of target object, 90-92% intensity on the 40-60% part of the target object, target object corresponds to a pre-defined intensity map, etc.). The global hypothesis tracking system 110 generates (524) the likelihood score for each of the one or more paired segments based on the kinematic information and the feature likelihood information.

In some examples, the global hypothesis tracking system 110 generates (550) a plurality of target tracks based on the one or more multi-segment tracks. The global hypothesis tracking system 110 selects (560) a long-term track for each of the one or more target objects based on the plurality of target tracks and the transition probability between each part of the one or more paired segments.

Figure 6:
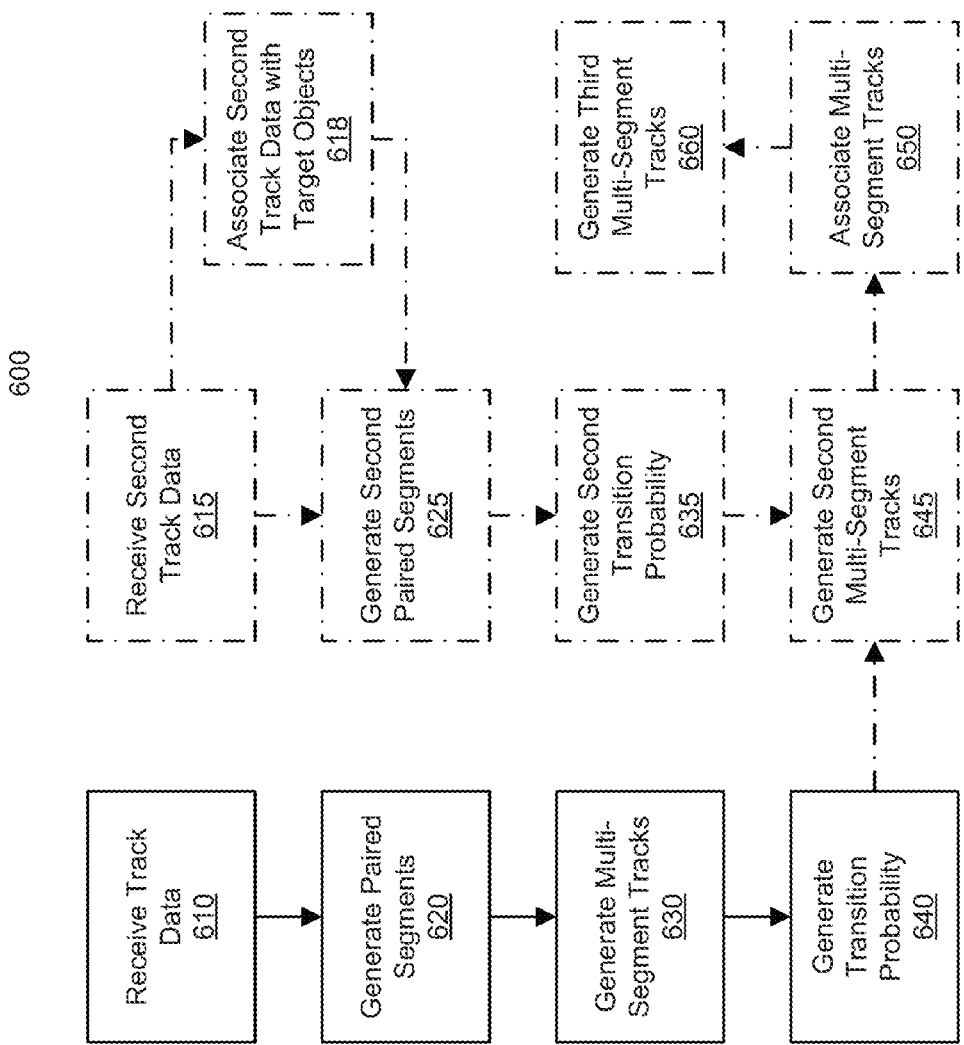
FIG. 6 is a flowchart of another exemplary global hypothesis tracking process.

FIG. 6 is flowchart of an exemplary global hypothesis tracking method, utilizing, for example, the global hypothesis tracking system 110 of FIG. 1. The global hypothesis tracking system 110 receives (610) track data. The track data can include kinematic information (e.g., speed, vector, etc.) associated with one or more target objects and/or feature likelihood information (e.g., size, shape, etc.) associated with the one or more target objects. The global hypothesis tracking system 110 generates (620) one or more paired segments based on the track data. Each of the one or more paired segments includes a list of one or more tracks incompatible with the paired segment (e.g., incompatible based on time, incompatible based on location, etc.) and a likelihood score (e.g., the percentage viability of the segments being connected, a scoring parameter that is indicative of the segments being not connected, etc.). The global hypothesis tracking system 110 generates (630) one or more multi-segment tracks based on the one or more paired segments. The global hypothesis tracking system 110 generates (640) a transition probability between each pair of the one or more paired segments based on the list of one or more incompatible tracks and the likelihood score associated with each paired segment of the pair of the one or more paired segments.

In some examples, the global hypothesis tracking system 110 receives (615) second track data. The second track data includes feature likelihood information associated with at least one of the one or more target objects (e.g., the second track data includes strong feature likelihood information and weak kinematic information (e.g., speed cannot be determined, vector cannot be determined, etc.). In some examples, the second track data includes radar transmission, radio transmission, and/or any other type of information associated with a target object. The global hypothesis tracking system 110 associates (618) the second track data with the at least one of the one or more target objects. The global hypothesis tracking system 110 generates (625) one or more second paired segments based on the track data and the association with the target objects. The global hypothesis tracking system 110 generates (635) a second transition probability between each pair of the one or more second paired segments based on the list of one or more incompatible tracks, the likelihood score associated with each paired segment of the pair of the one or more second paired segments, and the second track data associated the at least one of the one or more target objects. The global hypothesis tracking system 110 generates (645) one or more second multi-segment tracks based on the one or more paired segments, the one or more second paired segments, and the transition probability between each of the one or more second paired segments. In other words, the technology enables track data (e.g., radio signals, radar signals, etc.) to be associated with a track even if the kinematic information about the track data cannot be determined.

In some examples, the global hypothesis tracking system 110 associates (650) the one or more second multi-segment tracks with the one or more multi-segment tracks based on a transition probability between intersecting paired segments. The global hypothesis tracking system 110 generates (660) one or more third multi-segment tracks based on the one or more multi-segment tracks, the one or more second multi-segment tracks, and the associations between the one or more second multi-segment tracks with the one or more multi-segment tracks.

In other examples, the second track data includes kinematic information that is not assigned to the one or more target objects. In some examples, the global hypothesis tracking system 110 generates the list of the one or more tracks for each of the one or more paired segments based on the kinematic information. In other examples, the likelihood score for each paired segment of the one or more paired segments is indicative of a probability of a transition in a track between the paired segments. In some examples, the feature likelihood information is indicative of a probability of a feature type (e.g., antenna, turret, etc.) in the track data.

In other examples, each of the one or more paired segments are indicative of a local cluster hypothesis of a movement of a target object along a track. In some examples, the one or more multi-segment tracks are indicative of a global hypothesis of a movement of a target object along a track. In other examples, the track data includes measurement and signature intelligence data, movement intelligence data, signal intelligence data, imagery intelligence data, and/or human intelligence data.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Computer program products suitable for embodying computer program instructions and data include all forms of non-volatile memory, including by way of example semiconductor memory devices. The computer program products can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A system for generating global hypothesis tracks associated with one or more target objects, the system comprising:

one or more processors and a memory coupled to the one or more processors for storing computer program instructions, wherein the computer program instructions are configured to cause, when executed by the one or more processors, the one or more processor to:

store track data, received from a sensor observing one or more target objects, in the memory, the track data comprising kinematic information associated with the one or more target objects, feature likelihood information associated with the one or more target objects, or any combination thereof;

generate one or more paired segments based on the track data loaded from the memory, each of the one or more paired segments comprising a list of one or more tracks incompatible with the paired segment, the paired segment having two segments, and a likelihood score, the tracks incompatible with the paired segment being tracks sharing common track data; and generate a transition probability between each pair of the one or more paired segments based on the list of one or more tracks incompatible with the paired segment and the likelihood score associated with each paired segment of the pair of the one or more paired segments, and generate one or more multi-segment tracks associated with the one or more observed target objects and based on the one or more paired segments and the generated transition probability between each pair of the one or more paired segments, the generated one or more multi-segment tracks having a transition probability above a threshold.

2. The system of claim 1, wherein the one or more processors are further caused to:

receive second track data, the second track data comprises kinematic information associated with one or more target objects, feature likelihood information associated with the one or more target objects, or any combination thereof;

generate one or more second paired segments based on the second track data, each of the one or more second paired segments comprises a list of one or more tracks incompatible with the paired segment and a likelihood score; and generate one or more second multi-segment tracks based on the one or more paired segments and the one or more second paired segments, and generate a second transition probability between each pair of the one or more second paired segments based on the list of one or more incompatible tracks and the likelihood score associated with each paired segment of the pair of the one or more second paired segments.

3. The system of claim 2, wherein the track data is associated with a time period, the second track data is associated with a second time period, and the second time period occurs in time before the time period.

4. The system of claim 1, wherein the track data is associated with a time period and the one or more processors are further caused to:

receive second track data, the second track data associated with a second time period and the second time period occurs in time after the time period and the second track data comprises kinematic information associated with one or more target objects, feature likelihood information associated with the one or more target objects, or any combination thereof;

generate one or more second paired segments based on the second track data, each of the one or more second paired segments comprises a list of one or more tracks incompatible with the paired segment and a likelihood score;

generate one or more second multi-segment tracks based on the one or more paired segments and the one or more second paired segments, generate a second transition probability between each pair of the one or more second paired segments based on the list of one or more incompatible tracks and the likelihood score associated with each paired segment of the pair of the one or more second paired segments, associate the one or more second multi-segment tracks with the one or more multi-segment tracks based on a transition probability between intersecting paired segments, and generate one or more third multi-segment tracks based on the one or more multi-segment tracks, the one or more second multi-segment tracks, and the associations between the one or more second multi-segment tracks with the one or more multi-segment tracks.

5. The system of claim 1, wherein the one or more processors are further caused to:

determine the feature likelihood information based on a target object in the track data, and generate the likelihood score for each of the one or more paired segments based on the kinematic information and the feature likelihood information.

6. The system of claim 1, wherein the one or more processors are further caused to:

determine the feature likelihood information based on a target object shape in the track data, an image feature in the track data, a radar related feature in the track data, a spectral feature in the track data, measurement and signature intelligence data in the track data, intelligence information associated with the track data, or any combination thereof, and generate the likelihood score for each of the one or more paired segments based on the kinematic information and the feature likelihood information.

7. The system of claim 1, wherein the one or more processors are further caused to generate the list of the one or more tracks incompatible with the paired segment for each of the one or more paired segments based on the kinematic information.

8. A computer-implemented method for generating global hypothesis tracks associated with one or more target objects, the method comprising:

receiving at one or more processors track data from a sensor observing one or more target objects, the track data comprising kinematic information associated with one or more target objects, feature likelihood information associated with the one or more target objects, or any combination thereof;

generating using the one or more processors one or more paired segments based on the track data, each of the one or more paired segments comprising a list of one or more tracks incompatible with the paired segment, the paired segment having two segments, and a likelihood score, the tracks incompatible with the paired segment tracks sharing common track data;

generating using the one or more processors a transition probability between each pair of the one or more paired segments based on the list of one or more incompatible tracks and the likelihood score associated with each paired segment of the pair of the one or more paired segments; and generating using the one or more processors one or more multi-segment tracks based on the one or more paired segments and the generated transition probability between each pair of the one or more paired segments, the generated one or more multi-segment tracks having a transition probability above a threshold.

9. The method of claim 8, further comprising:

receiving at the one or more processors second track data, the second track data comprises kinematic information associated with one or more target objects, feature likelihood information associated with the one or more target objects, or any combination thereof;

generating using the one or more processors one or more second paired segments based on the second track data, each of the one or more second paired segments comprises a list of one or more tracks incompatible with the paired segment and a likelihood score;

generating using the one or more processors a transition probability between each pair of the one or more second paired segments based on the list of one or more incompatible tracks and the likelihood score associated with each paired segment of the pair of the one or more second paired segments; and generating using the one or more processors one or more second multi-segment tracks based on the one or more paired segments, the one or more second paired segments, and the transition probability between each of the one or more second paired segments.

10. The method of claim 8, wherein the track data is associated with a time period and the method further comprising:

receiving at the one or more processors second track data, the second track data associated with a second time period and the second time period occurs in time after the time period and the second track data comprises kinematic information associated with one or more target objects, feature likelihood information associated with the one or more target objects, or any combination thereof;

generating using the one or more processors one or more second paired segments based on the second track data, each of the one or more second paired segments comprises a list of one or more tracks incompatible with the paired segment and a likelihood score;

generating using the one or more processors a second transition probability between each pair of the one or more second paired segments based on the list of one or more tracks incompatible with the paired segment and the likelihood score associated with each paired segment of the pair of the one or more second paired segments;

generating using the one or more processors one or more second multi-segment tracks based on the one or more paired segments, the one or more second paired segments, and the transition probability between each of the one or more second paired segments;

associating using the one or more processors the one or more second multi-segment tracks with the one or more multi-segment tracks based on a transition probability between intersecting paired segments; and generating using the one or more processors one or more third multi-segment tracks based on the one or more multi-segment tracks, the one or more second multi-segment tracks, and the associations between the one or more second multi-segment tracks with the one or more multi-segment tracks.

11. The method of claim 8, further comprising:
determining using the one or more processors the feature likelihood information based on a target object shape in the track data, an image intensity frequency in the track data, or any combination thereof, and generating using the one or more processors the likelihood score for each of the one or more paired segments based on the kinematic information and the feature likelihood information.

12. The method of claim 8, further comprising:
receiving at the one or more processors second track data, the second track data comprises feature likelihood information associated with at least one of the one or more target objects;

associating using the one or more processors the second track data with the at least one of the one or more target objects;

generating using the one or more processors a second transition probability between each pair of the one or more second paired segments based on the list of one or more incompatible tracks, the likelihood score associated with each paired segment of the pair of the one or more second paired segments, and the second track data associated the at least one of the one or more target objects; and generating using the one or more processors one or more second multi-segment tracks based on the one or more paired segments, the one or more second paired segments, and the transition probability between each of the one or more second paired segments.

13. The method of claim 12, wherein the second track data further comprises kinematic information that is not assigned to the one or more target objects.

14. The method of claim 8, further comprising:
generating using the one or more processors a plurality of target tracks based on the one or more multi-segment tracks; and selecting using the one or more processors a long-term track for each of the one or more target objects based on the plurality of target tracks and the transition probability between each part of the one or more paired segments.

15. The method of claim 8, further comprising generating using the one or more processors the list of the one or more tracks for each of the one or more paired segments based on the kinematic information.

16. The method of claim 8, wherein the likelihood score for each paired segment of the one or more paired segments is indicative of a probability of a transition in a track between the paired segment.

17. The method of claim 8, wherein the feature likelihood information is indicative of a probability of a feature type in the track data.

18. The method of claim 8, wherein each of the one or more paired segments are indicative of a local cluster hypothesis of a movement of a target object along a track.

19. The method of claim 8, wherein the one or more multi-segment tracks are indicative of a global hypothesis of a movement of a target object along a track.

20. The method of claim 8, wherein the track data comprises measurement and signature intelligence data, movement intelligence data, signal intelligence data, imagery intelligence data, human intelligence data, or any combination thereof.

21. A non-transitory computer readable program product, tangibly embodied in an information carrier, the computer program product including instructions that when executed by a data processing apparatus cause the data processing apparatus to:

receive track data from a sensor observing one or more target objects, the track data comprising kinematic information associated with one or more target objects, feature likelihood information associated with the one or more target objects, or any combination thereof;

generate one or more paired segments based on the track data, each of the one or more paired segments comprising a list of one or more tracks incompatible with the paired segment, the paired segment having two segments, and a likelihood score, the tracks incompatible with the paired segment tracks sharing common track data;

generate a transition probability between each pair of the one or more paired segments based on the list of one or more tracks incompatible with the paired segment and the likelihood score associated with each paired segment of the pair of the one or more paired segments; and generate one or more multi-segment tracks based on the one or more paired segments and the transition probability between each of the one or more paired segments, the generated one or more multi-segment tracks having a transition probability above a threshold.

* * * * *